(12) United States Patent
Bafna et al.

(10) Patent No.: US 12,047,253 B2
(45) Date of Patent: Jul. 23, 2024

(54) SYSTEM AND METHOD TO PROVIDE PRIORITY BASED QUALITY OF SERVICE FOR TELEMETRY DATA

(71) Applicant: Nutanix, Inc., San Jose, CA (US)

(72) Inventors: Mukesh Bafna, Pune (IN); Akshay Narayan Muramatti, Santa Clara, CA (US); Pranjal Bhor, Pune (IN); Amey Barve, Pune (IN)

(73) Assignee: Nutanix, Inc., San Jose, CA (US)

( * ) Notice: Subject to any disclaimer, the term of this patent is extended or adjusted under 35 U.S.C. 154(b) by 158 days.

(21) Appl. No.: 17/832,128

(22) Filed: Jun. 3, 2022

(65) Prior Publication Data
US 2023/0261951 A1    Aug. 17, 2023

(30) Foreign Application Priority Data
Feb. 11, 2022   (IN) .............................. 202241007279

(51) Int. Cl.
*H04L 43/04*    (2022.01)
*H04L 41/50*    (2022.01)
*H04L 43/12*    (2022.01)
*H04Q 9/00*    (2006.01)

(52) U.S. Cl.
CPC ............... *H04L 41/50* (2013.01); *H04Q 9/00* (2013.01)

(58) Field of Classification Search
CPC ......... H04L 41/50; H04L 43/12; H04L 43/04; H04Q 9/00
See application file for complete search history.

(56) References Cited

U.S. PATENT DOCUMENTS 7,555,046 B2    6/2009   Zoghlami et al.
8,549,518 B1   10/2013   Aron et al.
(Continued)

FOREIGN PATENT DOCUMENTS

| CN | 114026834 | | 2/2022 |
|---|---|---|---|
| EP | 3 128 475 | | 2/2017 |
| EP | 3 591 938 | A1 | 1/2020 |
| JP | 2018-533285 | A | 11/2018 |
| WO | WO-2015/114384 | A1 | 8/2015 |

OTHER PUBLICATIONS

"Active IQ Digital Advisor: Simple, intelligent, storage health"; NetApp Active IQ—Actionable Intelligence; https://www.netapp.com/services/support/active-iq/; Accessed on Oct. 15, 2020.
(Continued)

*Primary Examiner* — Chris Parry
*Assistant Examiner* — Hassan A Khan
(74) *Attorney, Agent, or Firm* — Foley & Lardner LLP

(57) ABSTRACT

Various embodiments disclosed herein are related to a non-transitory computer readable storage medium. In some embodiments, the medium includes instructions stored thereon that, when executed by a processor, cause the processor to determine, in a cluster of host machines, a priority level of telemetry data collected in the cluster, at least based on a data type of the telemetry data and a tag and store the telemetry data in a storage in the cluster. In some embodiments, a quality-of-service (QoS) is associated with the priority level. In some embodiments, the storage is associated with the priority level. In some embodiments, the medium includes the instructions stored thereon that, when executed by the processor, cause the processor to send the telemetry data from the storage to a server in accordance with the QoS, wherein the server is separate from the cluster.

20 Claims, 7 Drawing Sheets

(56) References Cited

U.S. PATENT DOCUMENTS

| | | | |
|---|---|---|---|
| 8,561,175 B2 | 10/2013 | Williams et al. | |
| 8,601,473 B1 | 12/2013 | Aron et al. | |
| 8,682,918 B2 | 3/2014 | Ramanujam | |
| 8,745,214 B2 | 6/2014 | Inamdar et al. | |
| 8,850,130 B1 | 9/2014 | Aron et al. | |
| 8,863,124 B1 | 10/2014 | Aron | |
| 8,875,129 B2 | 10/2014 | Wagner et al. | |
| 8,909,766 B1 | 12/2014 | Hegg et al. | |
| 9,009,106 B1 | 4/2015 | Aron et al. | |
| 9,069,708 B2 | 6/2015 | Gill et al. | |
| 9,218,176 B1 | 12/2015 | Alberti et al. | |
| 9,305,008 B2 | 4/2016 | Mensch et al. | |
| 9,323,579 B2 | 4/2016 | Parikh | |
| 9,336,132 B1 | 5/2016 | Aron et al. | |
| 9,413,616 B2 | 8/2016 | Nguyen et al. | |
| 9,419,856 B1 | 8/2016 | Chawla et al. | |
| 9,459,926 B2 | 10/2016 | Shakirzyanov et al. | |
| 9,633,037 B2 | 4/2017 | Smith et al. | |
| 9,652,265 B1 | 5/2017 | Narayanasamy et al. | |
| 9,652,485 B1 | 5/2017 | Bhargava et al. | |
| 9,747,287 B1 | 8/2017 | Bhardwaj et al. | |
| 9,772,866 B1 | 9/2017 | Aron et al. | |
| 9,799,082 B1 | 10/2017 | Raskin et al. | |
| 9,817,651 B2 | 11/2017 | Viswanathan et al. | |
| 9,942,034 B2 | 4/2018 | Le Saint et al. | |
| 10,007,513 B2 | 6/2018 | Malladi et al. | |
| 10,007,710 B2 | 6/2018 | Chen et al. | |
| 10,027,728 B2 | 7/2018 | Yang et al. | |
| 10,061,464 B2 | 8/2018 | Addala et al. | |
| 10,080,098 B1* | 9/2018 | Edge | H04L 63/08 |
| 10,114,882 B2 | 10/2018 | Lipstone | |
| 10,158,534 B2 | 12/2018 | Acharya et al. | |
| 10,178,021 B1 | 1/2019 | Devillard et al. | |
| 10,313,474 B1 | 6/2019 | Farrugia et al. | |
| 10,432,699 B2 | 10/2019 | Griffith et al. | |
| 10,503,427 B2 | 12/2019 | Botes et al. | |
| 10,567,262 B1 | 2/2020 | Mutnuru | |
| 10,585,908 B2 | 3/2020 | Russell | |
| 10,713,079 B2 | 7/2020 | Muramatti et al. | |
| 10,785,122 B2 | 9/2020 | Inamdar et al. | |
| 10,791,421 B1 | 9/2020 | Rothschild et al. | |
| 11,055,273 B1 | 7/2021 | Meduri et al. | |
| 11,061,729 B2 | 7/2021 | Singh et al. | |
| 11,082,525 B2 | 8/2021 | Sethuraman et al. | |
| 2005/0055575 A1 | 3/2005 | Evans et al. | |
| 2007/0291780 A1* | 12/2007 | Smith | H04L 47/2441 370/411 |
| 2008/0126773 A1 | 5/2008 | Martinez et al. | |
| 2010/0162374 A1 | 6/2010 | Nair | |
| 2011/0007748 A1 | 1/2011 | Yin et al. | |
| 2011/0280134 A1 | 11/2011 | Zheng | |
| 2012/0089410 A1 | 4/2012 | Mikurak | |
| 2012/0271926 A1 | 10/2012 | Shakirzyanov et al. | |
| 2013/0013921 A1 | 1/2013 | Bhathena et al. | |
| 2013/0103834 A1 | 4/2013 | Dzerve et al. | |
| 2014/0317273 A1 | 10/2014 | Kruglick | |
| 2014/0372376 A1 | 12/2014 | Smith et al. | |
| 2015/0180714 A1 | 6/2015 | Chunn et al. | |
| 2015/0193220 A1 | 7/2015 | Rork et al. | |
| 2015/0220331 A1 | 8/2015 | Bernstein et al. | |
| 2015/0277942 A1 | 10/2015 | Rork et al. | |
| 2015/0281285 A1 | 10/2015 | Bharali et al. | |
| 2015/0281374 A1 | 10/2015 | Petersen et al. | |
| 2015/0286475 A1 | 10/2015 | Vangelov et al. | |
| 2015/0288636 A1 | 10/2015 | Yalavarty et al. | |
| 2016/0085772 A1 | 3/2016 | Vermeulen et al. | |
| 2016/0105370 A1 | 4/2016 | Mellor et al. | |
| 2016/0205189 A1 | 7/2016 | Mopur et al. | |
| 2016/0253710 A1 | 9/2016 | Publicover et al. | |
| 2016/0259598 A1 | 9/2016 | Ikeuchi et al. | |
| 2016/0292166 A1 | 10/2016 | Russell | |
| 2016/0294605 A1 | 10/2016 | Searle et al. | |
| 2017/0048694 A1 | 2/2017 | Nafe et al. | |
| 2017/0085447 A1 | 3/2017 | Chen et al. | |
| 2017/0172473 A1 | 6/2017 | Wedekind et al. | |
| 2017/0318113 A1 | 11/2017 | Ganichev et al. | |
| 2017/0373930 A1 | 12/2017 | Danilov et al. | |
| 2018/0012032 A1 | 1/2018 | Radick et al. | |
| 2018/0026904 A1* | 1/2018 | Van De Groenendaal | H04L 41/145 |
| 2018/0131770 A1 | 5/2018 | Doraiswamy et al. | |
| 2018/0136862 A1 | 5/2018 | Rusenas et al. | |
| 2018/0159833 A1 | 6/2018 | Zhang et al. | |
| 2018/0167203 A1 | 6/2018 | Belenko | |
| 2018/0167275 A1 | 6/2018 | Kovacheva et al. | |
| 2018/0176073 A1 | 6/2018 | Dubey et al. | |
| 2018/0176663 A1 | 6/2018 | Damaggio | |
| 2018/0183684 A1 | 6/2018 | Jacobson et al. | |
| 2018/0234337 A1 | 8/2018 | Goliya et al. | |
| 2018/0278541 A1 | 9/2018 | Wu et al. | |
| 2018/0302442 A1 | 10/2018 | Lucovsky et al. | |
| 2018/0330079 A1 | 11/2018 | Gray | |
| 2018/0332061 A1 | 11/2018 | Terada et al. | |
| 2019/0050301 A1 | 2/2019 | Juniwal et al. | |
| 2019/0052659 A1 | 2/2019 | Weingarten et al. | |
| 2019/0058626 A1 | 2/2019 | Knowles et al. | |
| 2019/0058643 A1 | 2/2019 | Knowles et al. | |
| 2019/0065292 A1 | 2/2019 | Yu et al. | |
| 2019/0065508 A1 | 2/2019 | Guturi et al. | |
| 2019/0073378 A1 | 3/2019 | Guturi et al. | |
| 2019/0109872 A1 | 4/2019 | Dhakshinamoorthy et al. | |
| 2019/0123928 A1 | 4/2019 | Aston | |
| 2019/0213089 A1 | 7/2019 | Podge et al. | |
| 2019/0220361 A1 | 7/2019 | Mageswaran et al. | |
| 2019/0281132 A1 | 9/2019 | Sethuraman et al. | |
| 2019/0303900 A1 | 10/2019 | Golberg | |
| 2019/0306121 A1 | 10/2019 | Anderson et al. | |
| 2019/0340168 A1 | 11/2019 | Raman et al. | |
| 2020/0004523 A1 | 1/2020 | Eroshkina et al. | |
| 2020/0026505 A1 | 1/2020 | Olderdissen | |
| 2020/0065317 A1 | 2/2020 | Sarkar et al. | |
| 2020/0073656 A1 | 3/2020 | Satapathy et al. | |
| 2020/0104222 A1 | 4/2020 | Ramamoorthi et al. | |
| 2020/0125454 A1 | 4/2020 | Naidu et al. | |
| 2020/0136920 A1 | 4/2020 | Doshi et al. | |
| 2020/0151325 A1 | 5/2020 | Chen et al. | |
| 2020/0151327 A1 | 5/2020 | Chen et al. | |
| 2020/0159560 A1 | 5/2020 | Safreno et al. | |
| 2020/0192640 A1 | 6/2020 | Lucas et al. | |
| 2020/0236168 A1 | 7/2020 | Todd | |
| 2020/0249938 A1 | 8/2020 | Shin et al. | |
| 2020/0249979 A1 | 8/2020 | Muramatti et al. | |
| 2020/0264928 A1 | 8/2020 | Kalmuk et al. | |
| 2020/0314065 A1 | 10/2020 | Roy et al. | |
| 2020/0342092 A1 | 10/2020 | Wei et al. | |
| 2020/0351192 A1 | 11/2020 | Murao | |
| 2020/0409339 A1 | 12/2020 | Arashanipalai et al. | |
| 2020/0409810 A1 | 12/2020 | Wu et al. | |
| 2020/0412615 A1 | 12/2020 | Baskaran et al. | |
| 2021/0004270 A1 | 1/2021 | Singh et al. | |
| 2021/0004297 A1 | 1/2021 | Scrivner et al. | |
| 2021/0014132 A1 | 1/2021 | Smith et al. | |
| 2021/0036886 A1 | 2/2021 | Patel et al. | |
| 2021/0111974 A1* | 4/2021 | Tayeb | G06F 11/3003 |
| 2021/0136146 A1 | 5/2021 | Welsch et al. | |
| 2021/0203732 A1 | 7/2021 | Webb et al. | |
| 2021/0216888 A1* | 7/2021 | Gatson | G06F 3/167 |
| 2021/0243024 A1 | 8/2021 | Holness et al. | |
| 2021/0389894 A1 | 12/2021 | Zhou et al. | |
| 2022/0070193 A1 | 3/2022 | Konda et al. | |
| 2022/0222010 A1* | 7/2022 | Bachmutsky | G06F 3/0655 |
| 2023/0224382 A1* | 7/2023 | Khan | H04L 47/2433 370/392 |

OTHER PUBLICATIONS

"AWS for the Edge"; Amazon Web Services; https://aws.amazon.com/edge/?trk=ps_a134p000003ymOnAAI&trkcampaign=pac_paids; Accessed on Oct. 15, 2020.

"Bringing Intelligence to the Edge," https://www.redhat.com/en/blog/bringing-intelligence-edge, pp. 1-1.

"Build Intelligence on the Router Using AI-Driven Telemetry," https://www.cisco.com/c/en/us/td/docs/iosxr/ncs5500/telemetry/73x/b-telemetry-cg-ncs5500-73x/AI-driven-telemetry.html, pp. 1-12.

"Cloud Insights"; Cloud Central; Cloud Insights—Monitor Optimize Your Hybrid Infrastructure; https://cloud.netapp.com/cloud-insights; Accessed on Oct. 15, 2020.

"Creating a SnapMirror policy to maximize transfer efficiency," docs.netapp.com/ocum-72/index.jsp?topic=%2Fcom.netapp.doc.onc-um-ag%2FGUID-657A296F-72A8-444D-BF77-E791BFE1E6B3.html, pp. 1-2.

"Manage data streams on the AWS IoT Greengrass Core," https://docs.aws.amazon.com/greengrass/v2/developerguide/manage-data-streams.html, pp. 1-2.

"Nutanix Insights Pulse Feature?"; HyperHCI Tech Blog; https://hyperhci.com/2019/09/13/nutanix-insights-pulse-feature/; Accessed on Oct. 21, 2020.

"Prioritize critical messages from your edge device to the Cloud," https://techcommunity.microsoft.com/t5/internet-of-things-blog/prioritize-critical-messages-from-your-edge-device-to-the-cloud/ba-p/1777959, pp. 1-1.

"Priority and time-to-live," https://docs.microsoft.com/en-us/azure/iot-edge/module-composition?view=iotedge-2020-11#priority-and-time-to-live, pp. 1-1.

"Reconciliation strategy|Config Connector Documentation|Google Cloud," https://cloud.google.com/config-connector/docs/concepts/reconciliation, pp. 1-2.

"Release Notes|NCC 4.4.0," pp. 1-10.

"What is data parsing?"; Device Management—Alibaba Cloud Documentation Center; https://www.alibabacloud.com/help/doc-detail/68702.htm; Accessed Nov. 17, 2020.

"What is vSAN Support Insight _ Quick Overview—Virtually Sensei," (Oct. 11, 2018), https://www.virtuallysensei.com/vsan-support-insight/, pp. 1-10.

Bryant Paul, "VMware Bringing SASE to SD-WAN VMworld 2020—Digital Thought Disruption," (Sep. 29, 2020), https://digitalthoughtdisruption.com/2020/09/29/vmware-bringing-sase-to-sd-wan-vmworld-2020/, pp. 1-10.

Cano, Ignacio, et al. "Curator: Self-Managing Storage for Enterprise Clusters" (Mar. 27, 2017), from https://www.usenix.org/conference/nsdi17/.

Dellemc White Paper, "Telemetry Streaming with iDRAC9 Server—Telemetry Performance Reports," Nov. 2020, 10 pages.

Fay Joe, "Waiting for Red Hat OpenShift 4.0_ Too late, 4.1 has already arrived . . . • Devclass," (Jun. 5, 2019), https://devclass.com/2019/06/05/red-hat-openshift-4-1-has-already-arrived/, pp. 1-2.

Google Cloud, "Release Notes Cloud Pub/Sub Documentation," https://cloud.google.com/pubsub/docs/release-notes, pp. 1-13.

Google Cloud, "What is Pub/Sub," https://cloud.google.com/pubsub/docs/overview, pp. 1-7.

Hindawi, "Management of IoT Sensor Data Using a Fog Computing Node," https://doi.org/10.1155/2019/5107457, pp. 1-10.

Julia White; "Enabling intelligent cloud and intelligent edge solutions for government"; Cloud Strategy; https://azure.microsoft.com/en-us/blog/enabling-intelligent-cloud-and-intelligent-edge-solutions-for-government/; Accessed on Oct. 15, 2020.

NetApp, "Active IQ Unified Manager 9.7 is now available!," https://www.netapp.com/blog/active-iq-unified-manager-9-7/, pp. 1-9.

NetApp, "What is the difference between SnapMirror 'normal' and 'low' priority," https://kb.netapp.com/Advice_and_Troubleshooting/Data_Protection_and_Security/SnapMirror/What_is_the_difference_between_SnapMirror_, pp. 1-2.

Nutanix, "Logbay Tags Reference Guide for Nutanix Cluster Check (NCC) 4.4.0," (Dec. 15, 2021), pp. 1-288.

Nutanix, "NCC Checks Reference," (Dec. 15, 2021), pp. 1-195.

Nutanix, "Nutanix Cluster Check (NCC) 4.4.0 Guide," (Dec. 15, 2021), pp. 1-39.

Nutanix, "Nutanix Insights: Simplifying IT Support Operations," pp. 1-2.

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Sep. 17, 2019), from https://nutanixbible.com/.

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Prashant Batra; "Announcing Nutanix Insights—Predictive Health & Support Automation Service"; https://www.nutanix.com/blog/announcing-nutanix-insights-predictive-health-support-automation-service; Accessed Oct. 21, 2020.

Slattery, Terry, "Telemetry vs. SNMP: Is one better for network management," https://www.techtarget.com/searchnetworking/answer/Telemetry-vs-SNMP-Is-one-better-for-network-management, pp. 1-4.

Tham, Chen-Khong, "Active Learning for IoT Data Prioritization in Edge Nodes Over Wireless Networks," https://ieeexplore.ieee.org/document/9255294, pp. 1-6.

VMware, "Configure log forwarding from Tanzu Kubernetes Grid (TKG) to vRealize Log Insight Cloud," (Apr. 27, 2020), https://williamlam.com/2020/04/configure-log-forwarding-from-tanzu-kubernetes-grid-tkg-to-vrealize-log-insight-cloud.html, pp. 1-12.

VMware, "Mark Traffic on a Distributed Port Group or Uplink Port Group," https://docs.vmware.com/en/VMware-vSphere/7.0/com.vmware.vsphere.networking.doc/GUID-84207BEA-986E-443E-94B0-B1EC66C56598.html, pp. 1-4.

VMware, "Try Wavefront by VMware Today!—Vmware Cloud Management," (Aug. 4, 2017), https://blogs.vmware.com/management/2017/08/try-wavefront-today.html, pp. 1-6.

VMware, "VMware SD-WAN Dynamic Multipath Optimization (DMPO) (2733094)," https://kb.vmware.com/s/article/2733094, pp. 1-15.

VMware, "VMware Smart Assurance Datasheet," pp. 1-4.

VMware, "VMware Tanzu at the Edge: Solution Architecture for ROBO Topology," (Oct. 1, 2020), https://tanzu.vmware.com/content/blog/vmware-tanzu-at-the-edge-solution-architecture-for-robo-topology, pp. 1-6.

VMware, "Why is Operational Anomaly Detection So Hard?—Cloud Blog—VMware" (Apr. 21, 2016), https://blogs.vmware.com/cloud/2016/04/21/operational-anomaly-detection-hard/, pp. 1-8.

VMware, Configure Log forwarding from VMware Tanzu Kubernetes Cluster to vRealize Log Insight Cloud—VMware Cloud Management, (Jun. 11, 2020), https://blogs.vmware.com/management/2020/06/configure-log-forwarding-from-vmware-tanzu-kubernetes-cluster-to-vrealize-log-insight-cloud.html, 1-9 pages.

NetApp, "Active IQ Blog," (May 28, 2020), https://www.netapp.com/blog/data-management-active-iq/, pp. 1-9.

NetApp, "NetApp Active IQ," https://www.netapp.com/pdf.html?item=/media/9279-sb-3992.pdf, pp. 1-3.

NetApp, "NetApp Blog | We are the cloud storage specialists," https://www.netapp.com/blog/#q=RipWilson&t=Blogs&sort=relevancy&layout=card&f:@facet_language_mktg=[English], pp. 1-8.

Non-Final Office Action on U.S. Appl. No. 17/127,857 DTD Feb. 3, 2023.

Final Office Action on U.S. Appl. No. 17/508,620 DTD Nov. 29, 2022.

Non-Final Office Action on U.S. Appl. No. 17/835,625 DTD Dec. 1, 2022.

Foreign Search Report on EP DTD Jan. 29, 2024.

* cited by examiner

SYSTEM AND METHOD TO PROVIDE PRIORITY BASED QUALITY OF SERVICE FOR TELEMETRY DATA

CROSS-REFERENCE TO RELATED APPLICATION

This application is related to and claims priority under 35 U.S. § 119(a) from Indian Provisional Application No. 202241007279, filed Feb. 11, 2022, titled "SYSTEM AND METHOD TO PROVIDE PRIORITY BASED QUALITY OF SERVICE FOR TELEMETRY DATA," the entire contents of which are incorporated herein by reference for all purposes.

BACKGROUND

Telemetry can be the collection of measurements or other data at remote or inaccessible points and their automatic transmission to receiving equipment for monitoring. As business progresses through digital transformation and the line between business process and technology continue to blur, telemetry from across the data path can provide insights into both technical and business problems. As organizations may be increasingly reliant on applications to execute business—internally and externally, with customers and partners—the telemetry of greatest value may be generated from the application services that make up the data path.

SUMMARY

Various embodiments disclosed herein are related to a non-transitory computer readable storage medium. In some embodiments, the medium includes instructions stored thereon that, when executed by a processor, cause the processor to determine, in a cluster of host machines, a priority level of telemetry data collected in the cluster, at least based on a data type of the telemetry data and a tag. In some embodiments, a quality-of-service (QoS) is associated with the priority level. In some embodiments, the medium includes the instructions stored thereon that, when executed by the processor, cause the processor to store the telemetry data in a storage in the cluster. In some embodiments, the storage is associated with the priority level. In some embodiments, the medium includes the instructions stored thereon that, when executed by the processor, cause the processor to send the telemetry data from the storage to a server in accordance with the QoS, wherein the server is separate from the cluster.

Various embodiments disclosed herein are related to an apparatus. In some embodiments, the apparatus includes a processor and a memory. In some embodiments, the memory includes programmed instructions that, when executed by the processor, cause the apparatus to determine, in a cluster of host machines, a priority level of telemetry data collected in the cluster, at least based on a data type of the telemetry data and a tag. In some embodiments, a quality-of-service (QoS) is associated with the priority level. In some embodiments, the memory includes the programmed instructions that, when executed by the processor, cause the apparatus to store the telemetry data in a storage in the cluster. In some embodiments, the storage is associated with the priority level. In some embodiments, the memory includes the programmed instructions that, when executed by the processor, cause the apparatus to send the telemetry data from the storage to a server in accordance with the QoS, wherein the server is separate from the cluster.

Various embodiments disclosed herein are related to a method. In some embodiments, the method includes determining, in a cluster of host machines, a priority level of telemetry data collected in the cluster, at least based on a data type of the telemetry data and a tag. In some embodiments, a quality-of-service (QoS) is associated with the priority level. In some embodiments, the method includes storing the telemetry data in a storage in the cluster. In some embodiments, the storage is associated with the priority level. In some embodiments, the method includes sending the telemetry data from the storage to a server in accordance with the QoS, wherein the server is separate from the cluster.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

The disclosure relates generally to telemetry and, more particularly, to systems and methods for prioritizing telemetry data.

Figure 1:
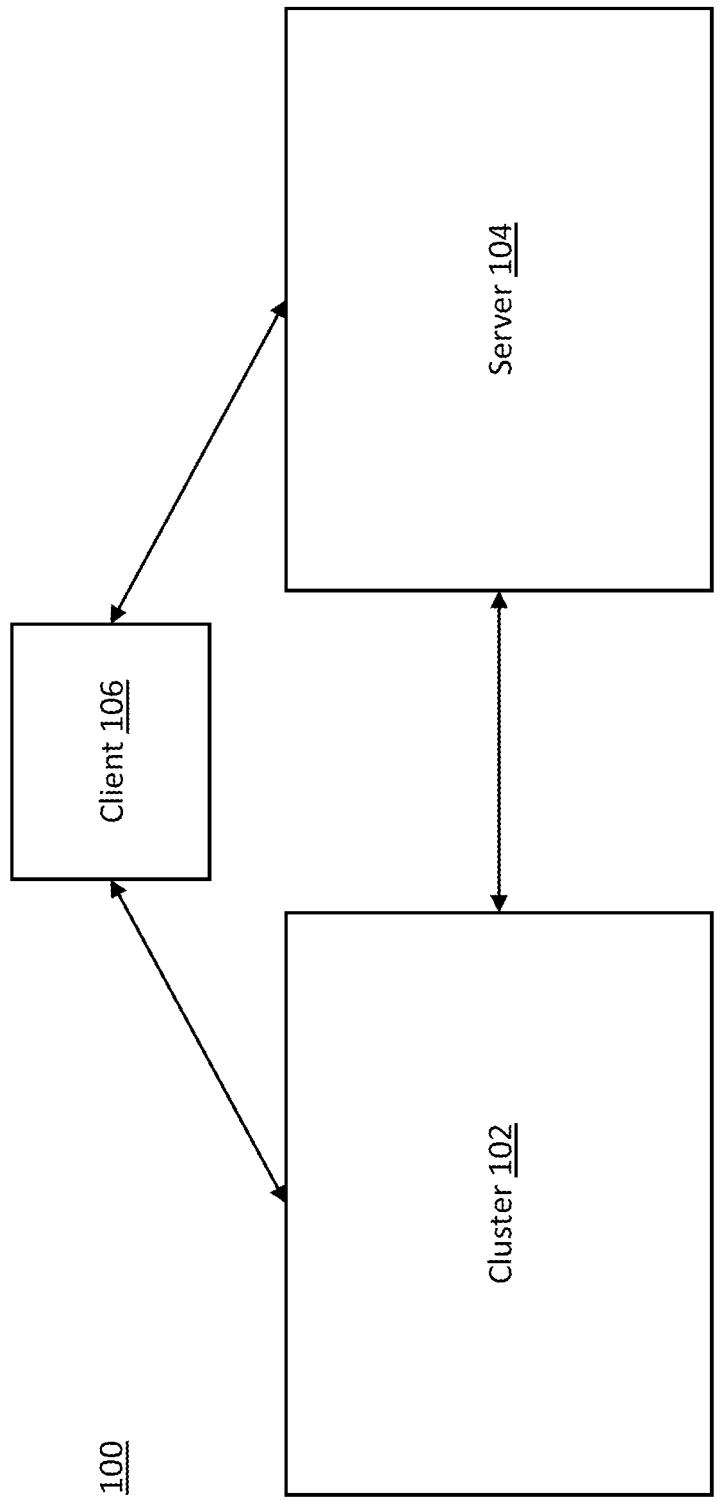
FIG. 1 is an example block diagram of a system, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Telemetry data of applications hosted on a cluster of host machines can be divided into different streams like config, alerts, metrics, events and logs. In some embodiments, all the data of a stream type is always stored together on the cluster (e.g., in files such as commitlogs) and sent to a server through the same storage or transport queue. If the commitlogs for any particular stream becomes full, then the cluster may not be able to collect any more data and if the transport queue of any stream faces any error, the cluster may not be able to send any data. This may create a problem of data unavailability at the server and may cause different problems particularly when critical data like the alerts, metering information, or cluster configuration is unavailable. What is desired is to separate the data based on its criticality so that different types of data get stored in different places and get transported to the server with different transport queues.

Disclosed herein are embodiments of a system and method to categorize the incoming data, based on its priority (e.g., high, medium, low), into different sections, store the data with logical or physical separation on the cluster, send the data to the server endpoint independently, and, in some embodiments, process data of different priorities independently in the server. In some embodiments, the higher the priority of the data, the better the Quality of Service (QoS e.g., higher bandwidth for transport, more retries on failure, or lower latency processing in the server) given to, assigned to, or otherwise associated with, the data. Such QoS can be given to the data while collecting on the cluster as well as while processing the data in the server.

In some embodiments, the system partitions telemetry data into high, medium, and low priorities (e.g., priority levels) depending on the type of data. For example, alert, metering, and cluster-config data is categorized as high priority data while data indicating a version of an application is low priority data. In some embodiments, the system maintains a separate storage area on the cluster for segregating the data based on priority. In some embodiments, the system maintains separate transport queues to transport data for each category. The system can allocate different bandwidths to the queues such that bandwidth of high priority data is greater than the bandwidth of medium priority data, which is greater than the bandwidth of low priority data.

In some embodiments, the system can tag telemetry data with appropriate priority information while sending to the server. The server may also be referred to as a pipeline. In some embodiments, the server handles the incoming data separately such that higher priority data gets lower processing latency. In some embodiments, all data sent to the server can be stored on a cloud. In some embodiments, the customer can receive telemetry data, such as some of the critical events and cluster health issues, through a portal (e.g., dashboard). In some embodiments, customers or applications can use application programming interfaces (APIs) to tag data before it is collected by the cluster. In some embodiments, a sniffing tool (tcpdump) can be used to see what packets are being sent from the cluster to server.

Referring now to FIG. 1, a block diagram of the system 100 is illustrated, in accordance with some embodiments of the present disclosure. The system 100 includes a cluster 102, a server 104 in communication with the cluster 102, and a client 106 in communication with the cluster 102 and the server 104. In some embodiments, the system 100 includes two or more clusters 102, and each cluster 102 is in communication with the server 104 and the client 106.

Figure 2:
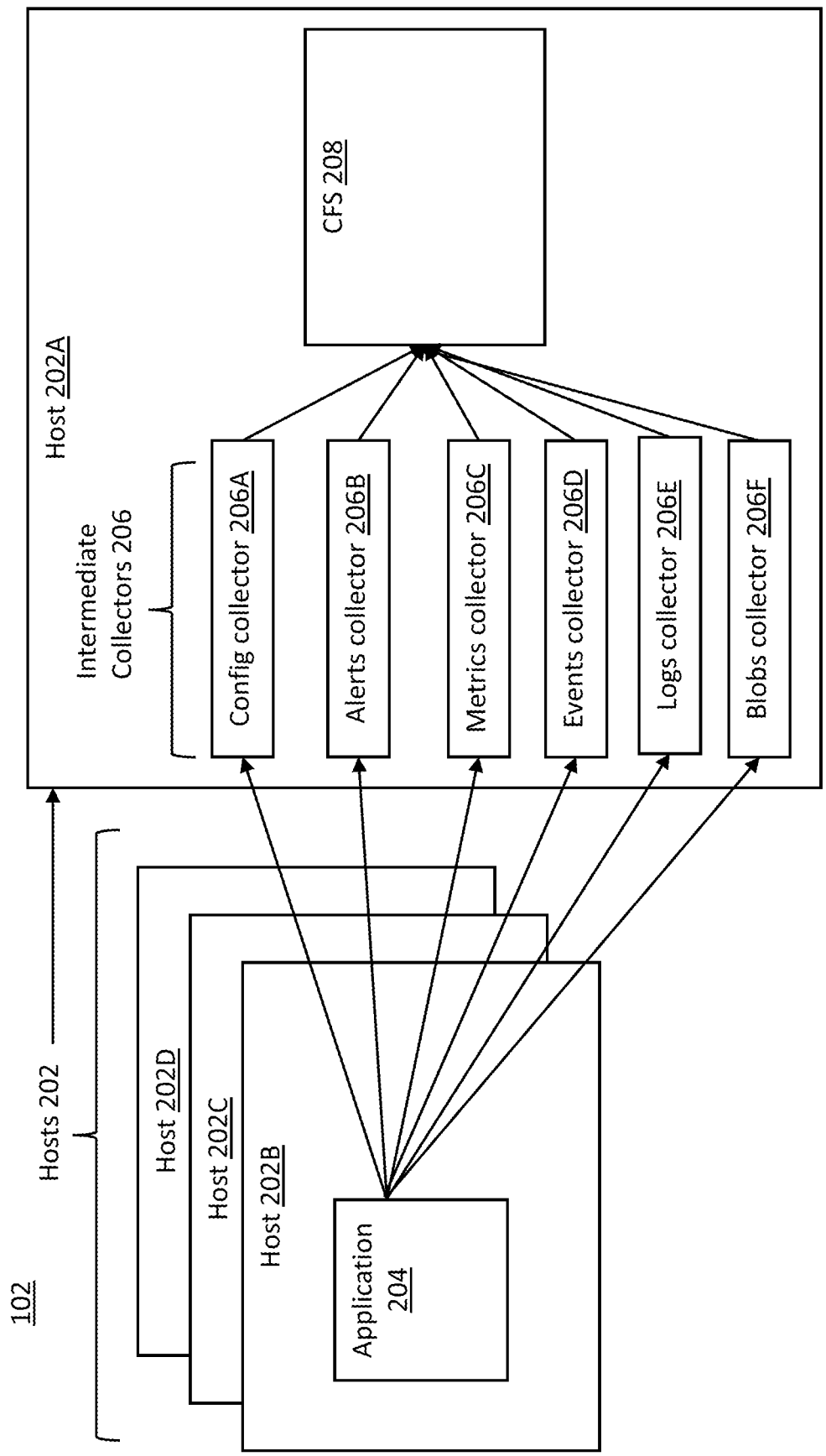
FIG. 2 is an example block diagram of a cluster of the system of FIG. 1, in accordance with some embodiments of the present disclosure.

Referring now to FIG. 2, a block diagram of the cluster 102 is illustrated, in accordance with some embodiments of the present disclosure. The cluster 102 includes a number of hosts 202 (e.g., hosts 202A, 202B, 202C, and 202D). The hosts 202 can be greater than or less than four without departing from the scope of the present disclosure. In some embodiments, the cluster 102 is a hyperconverged (HCI) cluster. In some embodiments, an HCI cluster includes number of disparate resources (e.g., storage, compute, network resources) and, in some embodiments, virtualization resources to virtualize the disparate resources. In some embodiments, a single component (e.g., a cluster management application) deploys, allocates, virtualizes, or otherwise manages the resources (e.g., in a software-defined way). In this way, an HCI can enable scaling (e.g., dynamic scaling) of the disparate resources (e.g., storage can be scaled separately, compute can be scaled separately, all can be scaled together, etc.) without having to add additional hardware or third-party services. The (e.g., hyperconverged) cluster 102 can be located in one data center (e.g., on-premises), in a cloud, across multiple data centers, multiple clouds or across a combination of one or more data centers and one or more clouds (e.g., hybrid cloud).

In some embodiments, the hosts 202 includes one or more applications (e.g., services, software, etc.). For example, as shown in FIG. 2, the host 202B includes an application 204. Each of the hosts 202A, 202C, and 202D can include one or more applications such as the application 204 without departing from the scope of the present disclosure. The application may be an application hosted (e.g., deployed, running) on a virtual machine (VM) or container, a compute application, an I/O operation (e.g., management) application, a data management application, a cluster management application, a UI application, a cluster health/wellness check management application (e.g., health check manager), a lifecycle management application (e.g., a lifecycle manager), an object storage application, a file storage application, an analytics application, a machine learning application, a computer vision application, a map-reduce application, or the like. Each application such as the application 204 can output raw telemetry data, which may include one or more of configurations/configuration files, alerts, metrics, events, logs, blobs, metering information, etc.

In some embodiments, at least one of the hosts 202 (e.g., host 202A) includes a number of intermediate collectors (e.g., dedicated collectors, single-type collectors, etc.) 206 each of which can collect a corresponding type of telemetry data from the raw telemetry data. The intermediate collectors 206 can collect the telemetry data as separate data streams. The collectors can include a config collector 206A that collects configurations/configuration files, an alerts collector 206B that collects alerts, a metrics collector 206C that collects metrics, an events collector 206D that collects events, a logs collector 206E that collects logs, and a blobs collector 206F that collects binary large objects (blobs). In some embodiments, each of the hosts include a number of collectors. In some embodiments, only one host includes a number of collectors.

The logs collector 206E may operate on logs generated from any application from the hosts 202, aggregate the logs, and summarize any issues, e.g., by correlating the logs with other data/metrics/configurations on the system. The config collector 206A may operate on configurations of the cluster 102 and summarize any issues. For example, the config collector 206A may detect that a cluster is configured with 20 MB storage instead of 20 GB storage, or that some VMs are not protected (e.g., not enough replication factor or fault tolerance).

At least one host of the hosts 202 (e.g., host 202A) includes a collector framework service (CFS) 208. In some embodiments, the CFS 208 collects each type of telemetry data from the intermediate collectors 206. The CFS 208 can collect the telemetry data from the intermediate collectors 206 as separate data streams. The CFS 208 can summarize or aggregate telemetry data (e.g., monitoring data, summary of configurations, alerts, summary of metrics, events, summary of logs, blobs) received from the intermediate collectors 206 to generate a set of telemetry data (e.g., aggregated telemetry data). In some embodiments, the CFS 208 can send the telemetry data or the summarized/aggregated telemetry data to the server 104 of FIG. 1 for further processing, storage, and/or other operations. In some embodiments, the CFS 208 configures the configuration of each of the intermediate collectors 206. For example, the CFS 208 can define the frequency of collection or how much for the intermediate collectors 206 to aggregate for the corresponding type.

The CFS 208 may identify when more or different telemetry data is needed and when false positives (e.g., an alert/indication of an issue/problem that does not exist) are received. The CFS 208 may instruct one or more intermediate collectors 206 to change its configuration. Such an instruction can result from detecting errors/issues/events, identifying an upgrade need, identifying a state change such as an increase in nodes or a change in a hypervisor type, or any of a variety of other triggers to change the configuration. In some embodiments, the CFS 208 collects the raw telemetry data from the applications such as the application 204.

In some embodiments, the intermediate collectors 206 are on the same host as the CFS 208. In some embodiments, the intermediate collectors 206 are on different hosts than the CFS 208. In embodiments having multiple clusters 102, each cluster 102 can include a CFS 208. In some embodiments, the intermediate collectors 206 communicate with the CFS 208 using remote procedure calls (RPCs) or application programming interfaces (APIs) (e.g., API calls, API requests). In some embodiments, the CFS 208 communicates with the server 104 using APIs.

Figure 3:
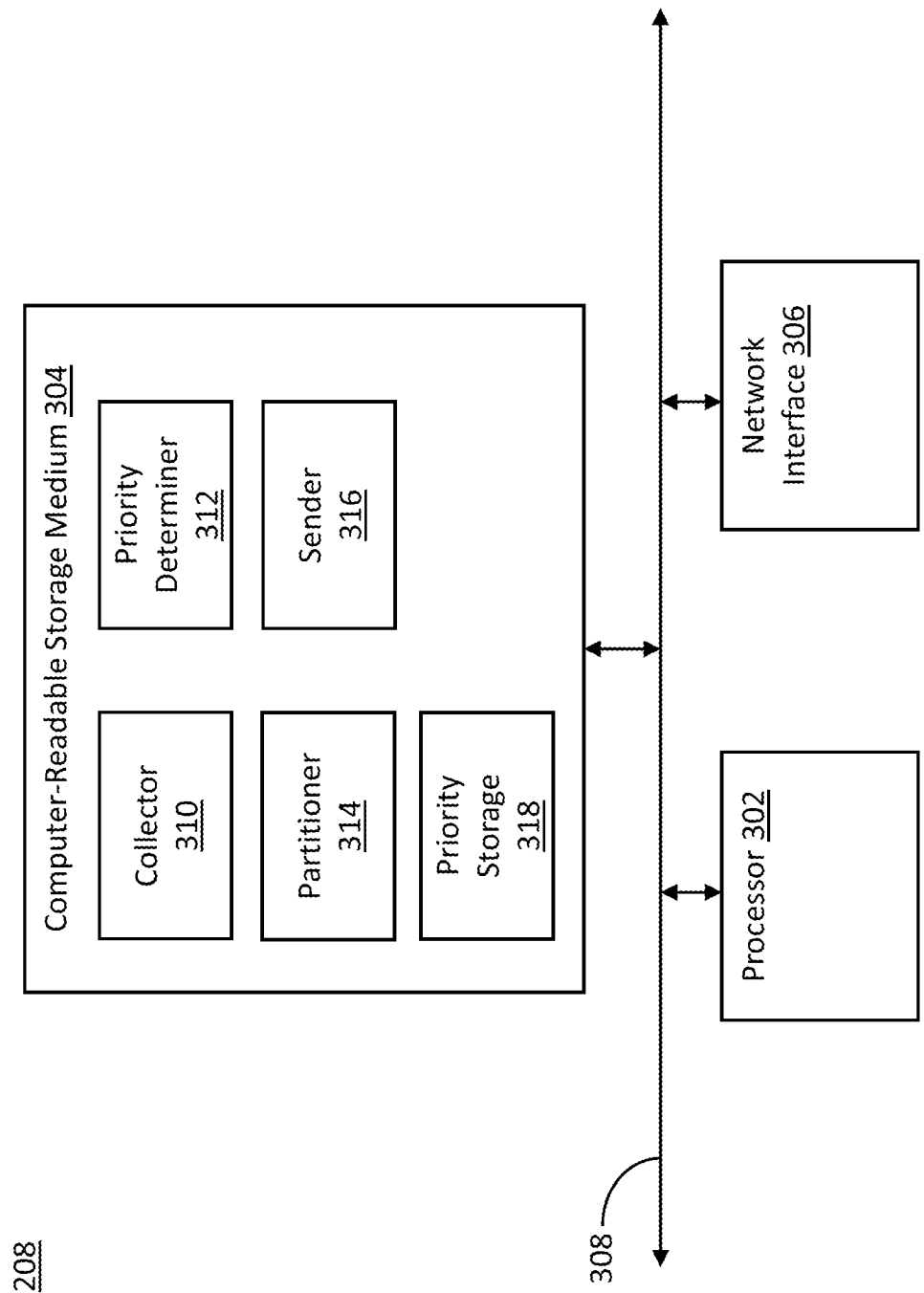
FIG. 3 is an example block diagram of a collector service framework of the cluster of FIG. 2, in accordance with some embodiments of the present disclosure.

Referring now to FIG. 3, a block diagram of the CFS 208 is illustrated, in accordance with some embodiments of the present disclosure. The CFS 208 includes a processor 302. Processor 302 is configured to execute computer program code, scripts, applications, services, or plugins. In one or more embodiments, processor 302 is a physical compute resource, a virtual compute resource, a containerized compute resource, central processing unit (CPU), a virtual CPU (vCPU), a multi-processor, a distributed processing system, an application specific integrated circuit (ASIC), and/or a suitable processing unit.

The CFS 208 includes the storage medium 304. In one or more embodiments, the storage medium 304 is an electronic, magnetic, optical, electromagnetic, infrared, and/or a semiconductor system (or apparatus or device). For example, the storage medium 304 includes a semiconductor or solid-state memory, a random access memory (RAM), virtual RAM (vRAM), a read-only memory (ROM), vROM, a magnetic tape, a removable computer diskette, a rigid magnetic disk, and/or an optical disk.

In some embodiments, the storage medium 304 includes the collector 310. The collector 310 can collect (e.g., receive, gather, etc.) telemetry data from hosts in the cluster 102 such as 202B, 202C, and 202D. The collector 310 can collect the telemetry data from intermediate collectors 206 such as config collector 206A, alerts collector 206B, metrics collector 206C, events collector 206D, logs collector 206E, blobs collector 206F, etc. In some embodiments, the collector 310 tags the telemetry data with an indication of priority provided by the application 204.

The storage medium 304 includes the priority determiner 312. The priority determiner 312 determines a priority (e.g., a priority level) of the telemetry data. In some embodiments, the priority determiner 312 determines a priority of the telemetry data based on a data type of the telemetry data, a data sub-type of the telemetry data, a user/owner/client of the telemetry data, a date of creation of the telemetry data, a date of transmission of the telemetry data, a size of the telemetry data, or any of other various characteristics associated with the telemetry data. The priority determiner 312 can determine a priority for telemetry data from each type of intermediate collector 206. For example, the priority determiner 312 determines that telemetry data including alerts (e.g., telemetry data received from alerts collector 206B) is a first level of priority (e.g., "high priority"), metering data is a second level of priority ("medium priority"), and all other telemetry data is a third level of priority (e.g., "low priority"). In some embodiments, the first level of priority is higher than the second level of priority, which is higher than the third level of priority. The priority determiner 312 can determine, or select from, any number of levels of priority without departing from the scope of the present disclosure.

In some embodiments, the priority determiner 312 determines a priority of the telemetry data based on a tag (e.g., indication of priority) alternative to, or in addition to, other characteristics associated with the telemetry data. This can be referred to dynamic prioritizing. The application 204 can tag (e.g., add, append, apply, or otherwise include in or associate the tag with) the telemetry data and send both the telemetry data and the corresponding tag to the host 202A (e.g., the CFS 208). The process of the tagging the telemetry data can be referred to as dynamic tagging. The application 204 can tag the telemetry data based on a request such as a client API request from the client 106, a state of the application, application variables, or system variables. In some embodiments, the application 204 provides an indication of priority to the CFS 208 (e.g., the collector 310), and the CFS 208 (e.g., the collector 310) tags the telemetry data with the indication of priority.

In some embodiments, the priority determiner 312 determines a priority of telemetry data based on an override policy. The override policy may provide rules by which to override a conflict. For example, the override policy includes a rule that, if a priority based on a data type is different from a priority based on a tag, a priority based on a tag overrides a priority based on a data type. Alternatively, the override policy can include a rule that, if a priority based on a data type is different from a priority based on a tag, a priority based on a data type overrides a priority based on a tag. In some embodiments, the override policy can have a list (e.g., a whitelist) of data types. The override policy can include a first rule that, if a priority based on a data type is different from a priority based on a tag, and the data type is included in the list, a priority based on a data type overrides a priority based on a tag. The override policy can include a second rule that, if a priority based on a data type is different from a priority based on a tag, and the data type is not included in the list, a priority based on a tag overrides a priority based on a data type The storage medium 304 includes the partitioner 314. The partitioner 314 partitions telemetry data (e.g., the telemetry data received from the various intermediate collectors 206) based on the priority (determined by the priority determiner 312) for each type of telemetry data. In some embodiments, the partitioner 314 stores a first telemetry data of a first priority (e.g., priority level) into a storage (e.g., a priority storage) allocated for (e.g., segregated for, partitioned for, dedicated to, unique to, only for) any telemetry data having the first priority (referred as "first-priority-type-telemetry-data"). Likewise, the partitioner 314 can store or populate a second telemetry data of a second priority into a storage allocated for any telemetry data having the second priority. The number of such allocated storages can be greater than two without departing from the scope of the present disclosure.

Each storage may be a file storage, an object storage, or a block storage. In an example for file storage, the partitioner 314 stores a first telemetry data of a first priority into a file (e.g., commitlog, commitlog file, etc.) allocated for first-priority-type-telemetry-data. The commitlog can be hosted on the storage allocated for first-priority-type-telemetry-data. In some embodiments, each storage can have a corresponding commitlog.

In some embodiments, the storage allocated to the first-priority-type-telemetry-data can operate (e.g., transmit, provide, provide access, make available, etc.) in accordance to a quality of service (QoS) that is corresponding to (e.g., commensurate with) the priority. For example, if there are three storages—one for high priority, one for medium priority, and one for low priority—the quality of service of the storage allocated for high priority provides a data rate or a bandwidth (e.g., for transmitting the telemetry data to the server 104) that is higher than the data rate or bandwidth provided by the storage allocated to the medium or low priority.

In some embodiments, each storage is associated with a transport queue. In some embodiments, the telemetry data stored in a given storage (based on its priority) is populated into a corresponding transport queue. In some embodiments, the transport queue sends the telemetry data to the server 104 in order of arrival into the transport queue (e.g., first-in-first-out). In some embodiments, the transport queue operates in accordance with a same QoS as the QoS at which the corresponding storage operates.

In some embodiments, the storage medium 304 includes the sender 316. In some embodiments, the sender 316 provides (e.g., sends, transmits, etc.) the telemetry data in accordance with the QoS associated with the storage that the telemetry data is stored in. In some embodiments, the sender 316 provides a hint (e.g., an indication of the priority of the telemetry data, an indication of the QoS of the telemetry data, an indication of both the priority of the telemetry data and the QoS of the telemetry data).

In some embodiments, the storage medium 304 includes the priority storage 318. In some embodiments, the priority storage 318 includes a number storages allocated for a corresponding telemetry data of a corresponding priority. For example, the priority storage 318 includes a high priority storage, a medium priority storage, and a low priority storage. The partitioner 314 can select one of the priority storages 318 to store telemetry data based on a priority of the telemetry data.

Figure 4:
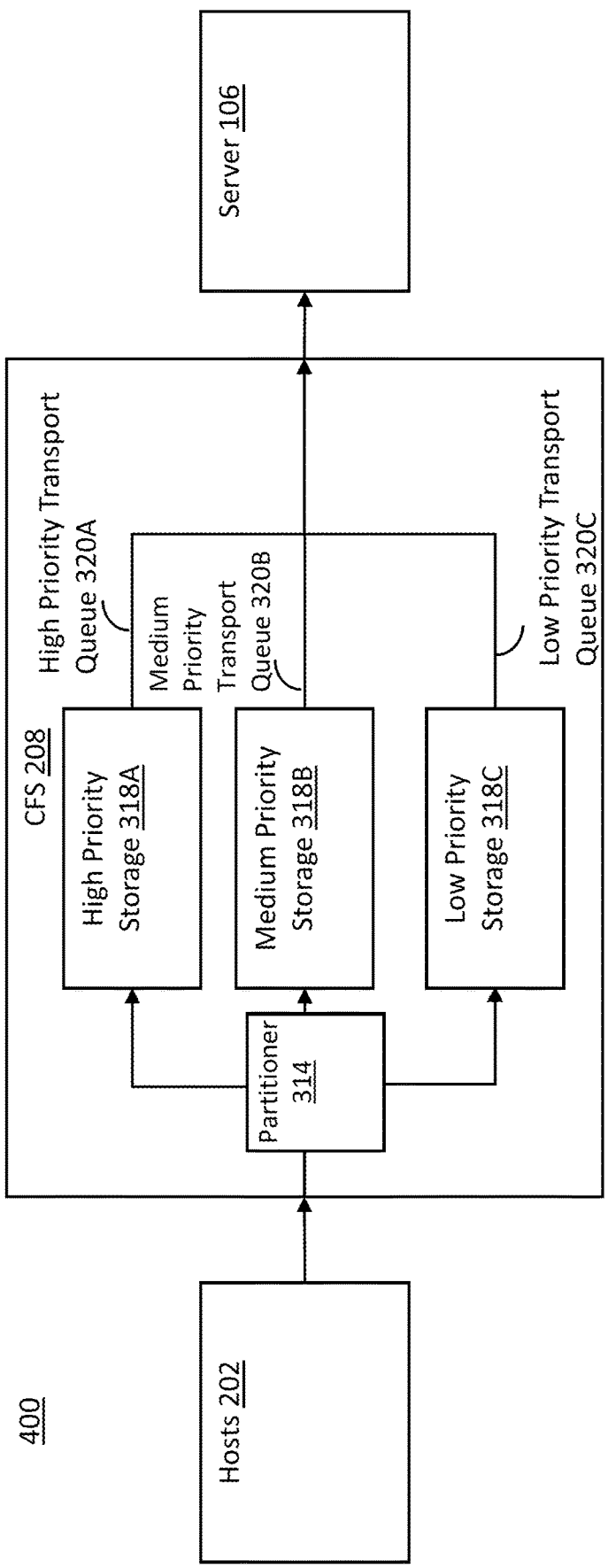
FIG. 4 is an example block diagram of a system, in accordance with some embodiments of the present disclosure.

Referring now to FIG. 4, a block diagram of a system 400 is illustrated, in accordance with some embodiments of the present disclosure. The system 400 may be similar to the system 100, but with some additional details shown and some details omitted. The system 400 is shown with CFS 208 as separate from the hosts 202, but the CFS 208 can be included in one host of the hosts 202 (e.g., such as in FIG. 1) without departing from the scope in the present disclosure.

The hosts 202 can send telemetry data to the CFS 208. The telemetry data includes, for example, logs, alerts, metering information, configurations, etc. Each type of telemetry data may have a subtype. For example, alerts may be for specific applications (e.g., one alert may be for a health check management application and another alert may be for an I/O operation application). The CFS 208 may determine priority of each type of telemetry data, sub-type of telemetry data, or based on tags provided by the applications of the hosts 202 (e.g., using the priority determiner 312). The CFS 208 may partition the telemetry data (e.g., after aggregating telemetry data from different intermediate collectors 206 or without aggregating telemetry data from different intermediate collectors 206) based on the priorities (e.g., using the partitioner 314). The CFS 208 may store some of the partitioned telemetry data in the high priority storage 318A based on its priority, some in the medium priority storage 318B based on its priority, and some in the low priority storage 318C based on its priority. For example, all alerts, or alerts only for a subset of the applications (e.g., the health check application) are stored in the high priority storage 318A.

Each storage can include, coupled to, or be associated with a corresponding transport queue. For example, the high priority storage 318A is coupled to a high priority transport queue 320A, the medium priority storage 318B is coupled to a medium priority transport queue 320B, and the low priority storage 318C is coupled to a low priority transport queue 320C.

The CFS 208 may send, to the server 104, each partitioned telemetry data in accordance with the QoS corresponding to its priority (e.g., its priority storage). For example, if the telemetry data was received or stored at the same time, and partitioned into high priority telemetry data (e.g., telemetry data of a first priority), medium priority telemetry data (e.g., telemetry data of a second priority), and low priority telemetry data (e.g., telemetry data of a third priority), the CFS 208 sends the high priority data before the CFS 208 sends the medium priority data or the low priority data.

Returning now to FIG. 3, in some embodiments, the CFS 208 includes a network interface 306. The network interface 306 allows the CFS 208 communicate with other components of the computer system 100. The network interface 306 includes wireless network interfaces such as BLUETOOTH, WIFI, Global System for Mobile Communications (GSM), wideband code division multiple access (WCDMA), Long-Term Evolution (LTE), or 5G; or wired network interfaces such as ETHERNET or Universal serial bus (USB).

In some embodiments, the CFS 208 includes a bus 308. The bus 308 is coupled to, and allows communication between, the processor 302, the computer-readable storage medium 304, and the network interface 306. In some embodiments, the bus 308 is a number of wires, optical fiber, a high-speed bus, etc.

Figure 5:
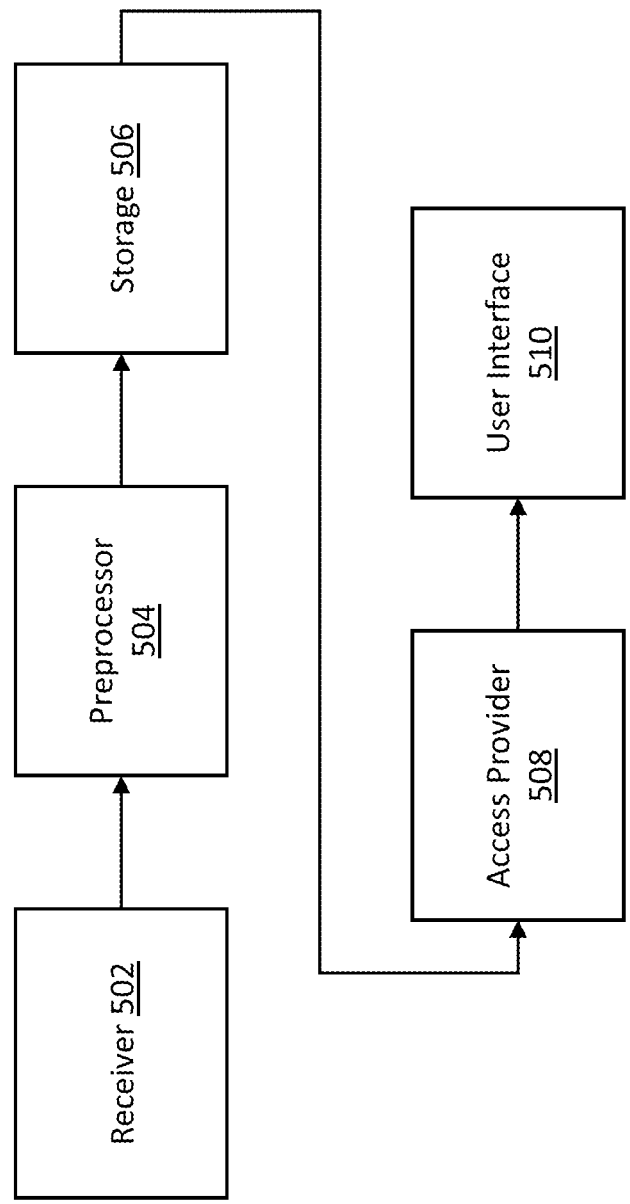
FIG. 5 is an example block diagram of a server of the system of FIG. 1, in accordance with some embodiments of the present disclosure.

Referring now to FIG. 5, a block diagram of the server 104 is illustrated, in accordance with some embodiments of the present disclosure. The server 104 can be remote from the cluster 102 and the client 106. The server 104 can be hosted on a cloud, a public cloud, a private cloud, on-premises, on a data center, etc.

In some embodiments, the server 104 includes a receiver 502. In some embodiments, the receiver 502 receives the telemetry data. The receiver 502 can receive the telemetry data at an API endpoint. In some embodiments, the receiver 502 load balances across multiple pods (e.g., using an application load balancer hosted thereon). The receiver 502 can run on top of a Kubernetes framework. The receiver 502 is stateless/compute only, in some embodiments, which can make the receiver 502 more scalable.

In some embodiments, the receiver 502 batches (e.g., aggregates) the telemetry data before sending the batched telemetry data to the preprocessor 504. In some embodiments, the receiver 502 sends the telemetry data without batching it in response to a hint from the cluster 102 (e.g., the CFS 208). The hint may be an indication that the telemetry data includes or is associated with a priority that meets or exceeds a priority threshold (the hint may be referred to as a priority indication). For example, any priority that is high (e.g., critical priority, higher priority, highest priority, level-1 priority, a first priority, a first priority level, high priority level, highest priority level, etc.) may meet or exceed the priority threshold. In some embodiments, the receiver 502 can put high priority telemetry data on separate data stream or separate pipeline for real-time notifications (e.g., dedicated for high priority telemetry data). It is understood that a pipeline is an instance of one or more of the blocks 502-510. Advantageously, omitting the batch step for high priority telemetry data, or sending the high priority telemetry data to a separate data stream or separate pipeline, can reduce the end-to-end latency for providing high priority telemetry data to the client 106.

In some embodiments, the server 104 includes a preprocessor 504 in communication with the receiver 502. In some embodiments, the preprocessor 504 reads the telemetry data from the receiver 502. In some embodiments the preprocessor 504 performs preprocessing operations such as data validation, data cleansing, schema validation, customer enrichment, segregating data. In some embodiments, the preprocessor 504 includes a customer license database.

In some embodiments, the preprocessor 504 reads the telemetry data from the receiver 502 as a data stream. In some embodiments, the preprocessor 504 reads the telemetry data from the receiver 502 as either as batched or non-batched telemetry data. The preprocessor 504 can process batches of telemetry data (e.g., process telemetry data in batch). In some embodiments, the preprocessor 504 receives batched data in a first (e.g., batched) data stream and non-batched data in a second (e.g., non-batched) data stream. In some embodiments, the preprocessor 504 prioritizes the second data stream over the first data stream (e.g., by preprocessing the telemetry data in the second data stream first). The preprocessor 504 can process telemetry data that is not batched. In some embodiments, the preprocessor 504 processes non-batched telemetry data in response to receiving the indication priority indication. Advantageously, processing non-batched telemetry data can reduce the end-to-end latency for providing high priority telemetry data to the client 106.

In some embodiments, the server 104 includes a storage 506 in communication with the preprocessor 504. The preprocessor 504 can write to the storage 506. The storage 506 can include a software as a service (SaaS) or an online analytical processing (OLAP) database. The SaaS or database can be used for interactive queries, user interface (UI), dashboard. The SaaS or database can store outputs of simple to medium queries. The storage 506 can include a data lake. The data lake can store long running jobs and outputs of medium to high complexity. The data lake can offer long-term retention.

In some embodiments, the server 104 includes an access provider 508 in communication with the storage 506. The access provider 508 can provide a user interface (UI) 510 access to the telemetry data stored in the storage 506. The access provider 508 may include access APIs to provide applications with access to the telemetry data. The APIs may include representational transfer (REST) APIs. The access provider 508 can write and schedule jobs to process the telemetry data. The job may be parallel computation including of multiple tasks that get spawned in response to an action or request.

In some embodiments, the server 104 includes the UI 510 in communication with the access provider 508. The UI 510 can be a portal or other UI to be accessed by the client 106. The UI 510 can display the telemetry data, a summary of telemetry data, output of a job, or any other output data derived from the telemetry data. The UI 510 may (e.g., UI 510 may allow the client 106 to) proactively monitor, provide alerts for, and support applications in the cluster 102 such as the application 204. The UI 510 may present the telemetry data or output data as a table, graph, text, or in any other visual manner suitable for monitoring, providing alerts for, and supporting applications.

Figure 6:
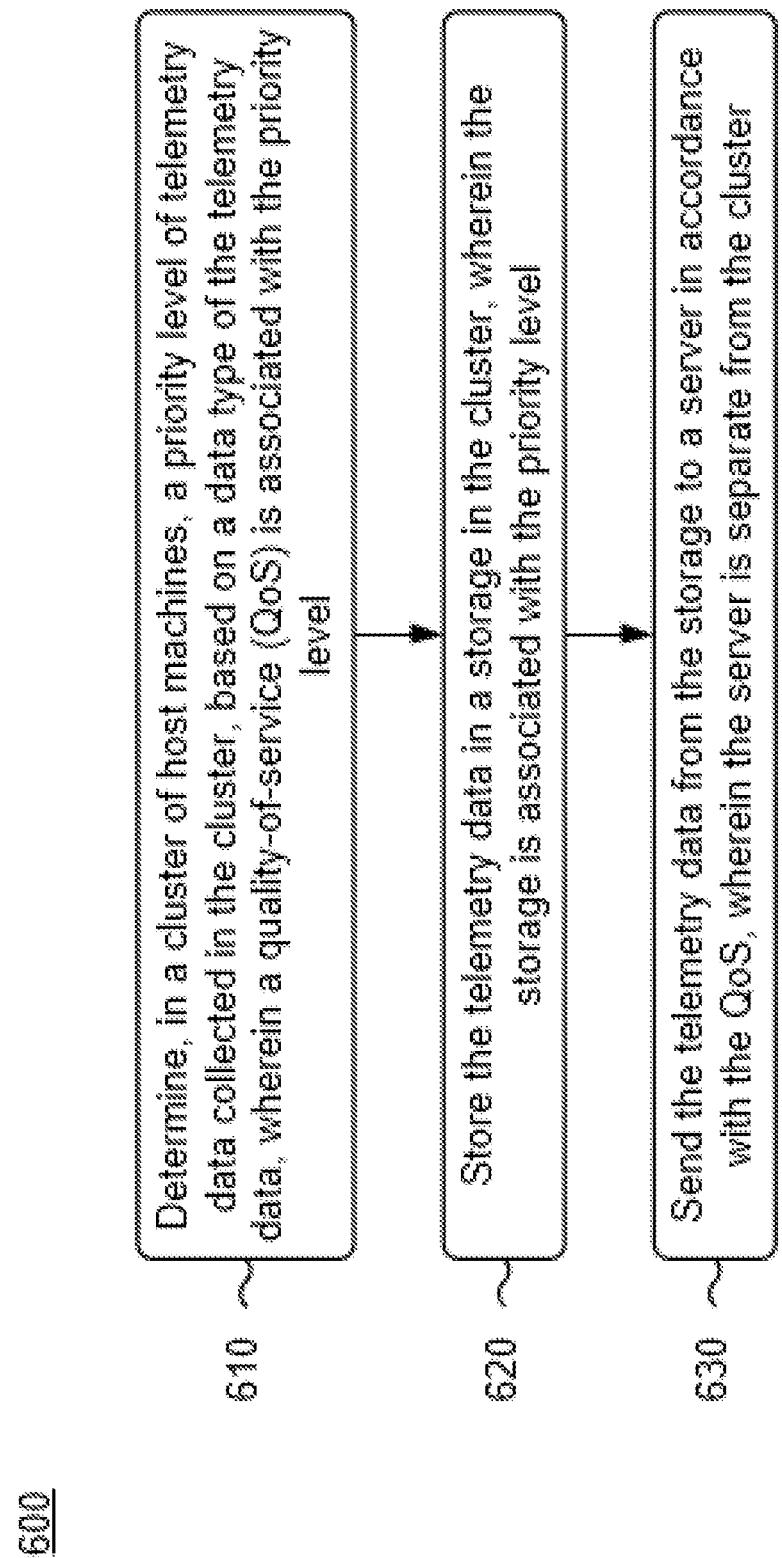
FIG. 6 is an example flowchart of a method for prioritizing telemetry data, in accordance with some embodiments of the present disclosure.

Referring now to FIG. 6, a flowchart of an example method 600 of prioritizing telemetry data is illustrated, in accordance with some embodiments of the present disclosure. The method 600 may be implemented using, or performed by, the system 100, one or more components of the system 100 (e.g., the CFS 208), or a processor associated with system 100 or the one or more components of system 100. Additional, fewer, or different operations or other embodiments may be performed in the method 600 depending on the embodiment.

At operation 610, a processor (e.g., the processor 302 of the CFS 208) determines, in a cluster of host machines (e.g., the cluster 102), a priority level of telemetry data collected in the cluster, based on a data type (or, in some embodiments, a data sub-type) of the telemetry data. In some embodiments, a quality-of-service (QoS) is associated with the priority level. In some embodiments, the processor receives the telemetry data from an application (e.g., the application 204). In some embodiments, the application tags the telemetry data. In some embodiments, the tag indicates the level of priority. In some embodiments, the processor extracts the telemetry data from a message (e.g., a data stream, a message in a data stream) including other telemetry data.

At operation 620, the processor stores the telemetry data in a storage (e.g., the priority storage 318) in the cluster, wherein the storage is associated with the priority level. In some embodiments, the processor stores the telemetry data in a file such as a commitlog. In some embodiments, the file (e.g., the commitlog) is in the storage in the cluster. In some embodiments, the processor determines that a priority level based on the tag is in conflict with a priority level based on the data type, the processor selects the priority level based on the tag (e.g., overriding the priority level based on the data type).

At operation 630, the processor sends the telemetry data from the storage to a server (e.g., the server 104) in accordance with the QoS. In some embodiments, the server is separate from the cluster. In some embodiments, the processor sends an indication of the priority level to the server. In some embodiments, the server provides the telemetry data to a client portal (e.g., the UI 510) in accordance with the priority level, based on the indication of the priority level. In some embodiments, a client (e.g., the client 106)

can access the telemetry data through the client portal. In some embodiments, the server provides the telemetry data to the client portal without batching the telemetry data with other telemetry data.

Figure 7:
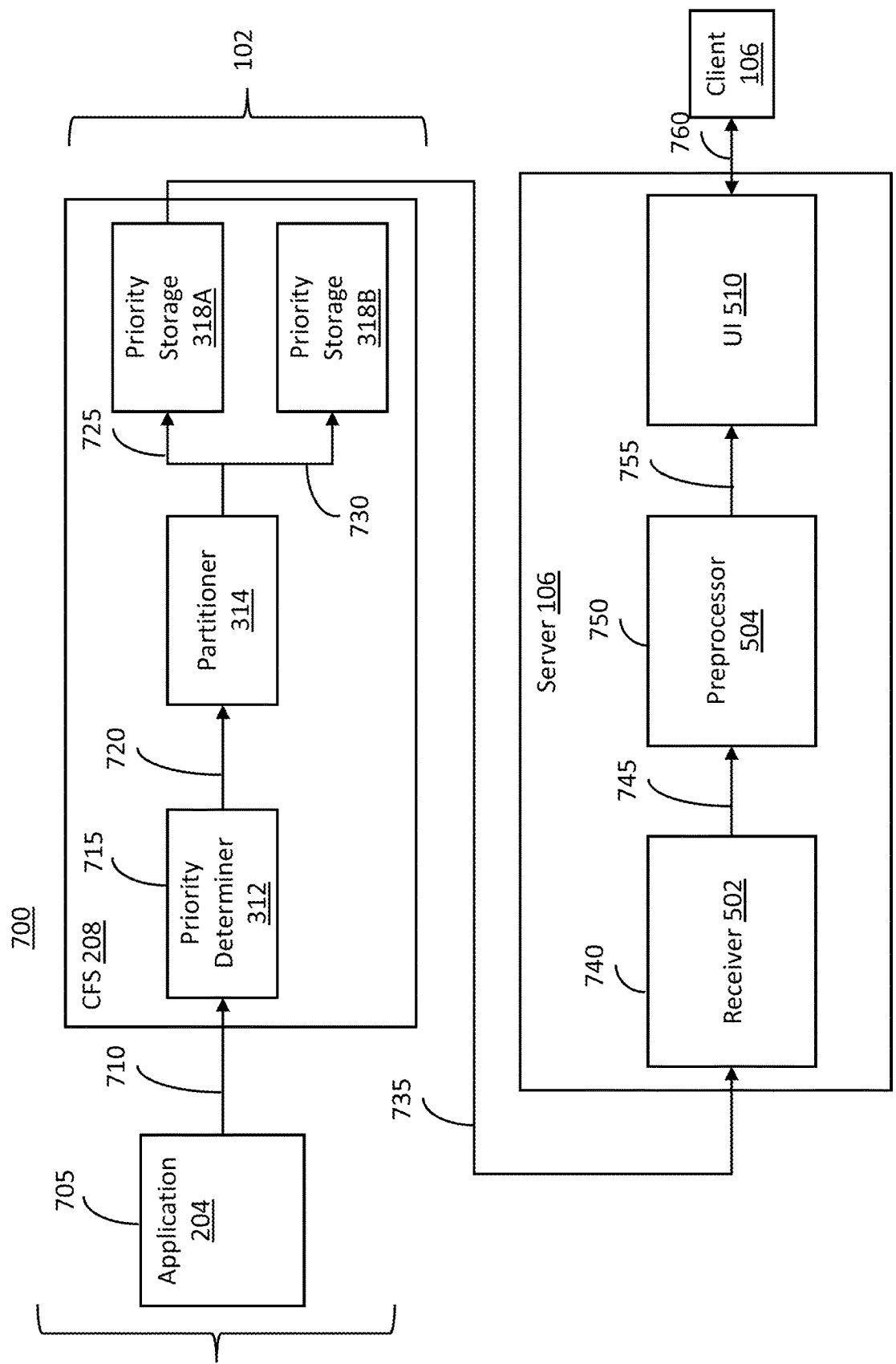
FIG. 7 is an example functional flow diagram of a method for prioritizing telemetry data, in accordance with some embodiments of the present disclosure.

FIG. 7 is an example functional flow diagram of a method 700 for prioritizing telemetry data, in accordance with some embodiments of the present disclosure. The method 700 may be implemented using, or performed by, the system 100, one or more components of the system 100 (e.g., the CFS 208), or a processor associated with system 100 or the one or more components of system 100. Additional, fewer, or different operations or other embodiments may be performed in the method 700 depending on the embodiment. Operations or other embodiments of the method 700 can be combined with one or more operations or other embodiments of the method 600. Some components of the system 100 are omitted from the method 700 for sake of brevity.

At operation 705, in some embodiments, the application 204 tags first telemetry data. The application 204 can tag a first portion of the telemetry data as high priority (e.g., critical, a first level of priority, etc.) and a second portion of the telemetry data as low priority (e.g., not critical, a second level of priority, etc.).

At operation 710, in some embodiments, the application 204 sends first telemetry data to the priority determiner 312 (via the collector 310) of the CFS 208. In some embodiments, the first telemetry data is raw telemetry data that is directly sent by the application 204 to the CFS 208. In some embodiments, the CFS 208 aggregates the raw telemetry data from the application 204 with other raw telemetry data from other applications in the cluster 102. In some embodiments, the first telemetry data is sent by the application 204 to the CFS 208 via intermediate collectors 206, each of which can collect a third portion of the first telemetry data associated a specific data type and forward the portion of the first telemetry data. The third portion of the first telemetry data can include some of the first portion of the telemetry data and some of the second portion the telemetry data. In some embodiments, the CFS 208 aggregates the portions of the first telemetry data from the application 204 (and telemetry data from any other applications in the cluster 102).

At operation 715, in some embodiments, the priority determiner 312 determines a priority of each portion of the telemetry data. For example, the priority determiner 312 determines that a fourth portion of the telemetry data is high priority telemetry data and a fifth portion of the telemetry data is low priority telemetry data. The priority determiner 312 may determine the priority of the telemetry data based on the type of telemetry data. For example, the priority determiner 312 determines that a sixth portion of the telemetry data that is an alert or metering information is high priority and a seventh portion of the telemetry data, including any other type of telemetry data, is low priority. The priority determiner 312 may determine the priority of the telemetry data based on tags associated with the telemetry data. For example, the priority determiner 312 determines that the first portion of the telemetry data is high priority because of the tag associated with the first portion and the second portion of the telemetry data is low priority because of the tag associated with the second portion. At operation 720, in some embodiments, the priority determiner 312 sends the telemetry data (e.g., each portion of the telemetry data) to the partitioner 314.

At operation 725, in some embodiments, the partitioner 314 sends the fourth portion of the telemetry data to the priority storage 318A based on determining that the fourth portion of the telemetry data is high priority data. The priority storage 318A may be associated with a first QoS. At operation 730, in some embodiments, the partitioner 314 sends the fifth portion of the telemetry data to the priority storage 318B based on determining that the fifth portion of the telemetry data is low priority data. The priority storage 318B may be associated with a second QoS that is different than (e.g., worse than, having a lower bandwidth, a lower data rate, a higher latency, etc.).

At operation 735, in some embodiments, the CFS 208 (e.g., the sender 318) sends the fourth portion of the telemetry data from the priority storage 318A to the receiver 502 of the server 106. The CFS 208 may send the fourth portion of the telemetry data to the receiver 502 of the server 106 based on the first QoS. For example, the CFS 208 sends the fourth portion of the telemetry data to the receiver 502 of the server 106 based the CFS 208 (e.g., the sender 318) determining that the fourth position of the telemetry data should be sent to the receiver 502 in order to comply with the first QoS. In some embodiments, the CFS 208 sends the fourth portion of the telemetry data to the receiver 502 of the server 106 based on a transmission schedule that the CFS 208 derived from, or otherwise based on, the first QoS. In some embodiments, the CFS (e.g., the sender 318) sends an indication of the high priority of the fourth portion of the telemetry data to the receiver 502 (e.g., along with the fourth portion of the telemetry data).

At operation 740, in some embodiments, the receiver 502 determines to bypass batching the fourth portion of the telemetry data with other portions of the telemetry data based on the indication of the high priority of the fourth portion of the telemetry data. At operation 745, the receiver 502 sends the non-batched fourth portion of the telemetry data to the preprocessor 504. The receiver 502 may send the indication of the high priority of the fourth portion of the telemetry data to the preprocessor 504. At operation 750, in some embodiments, the preprocessor 504 preprocesses the fourth portion of the telemetry data based on the indication of the high priority of the fourth portion of the telemetry data. At operation 755, in some embodiments, the preprocessor 504 sends the fourth portion of the telemetry to the UI 510 (e.g., via the storage 506 and the access provider 508). At operation 760, in some embodiments, the client 106 accesses the fourth portion of the telemetry data from the UI 510.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the disclosure be defined by the claims appended hereto and their equivalents.

What is claimed is:

1. A non-transitory computer readable storage medium comprising instructions stored thereon that, when executed by a processor, cause the processor to:
   determine, in a cluster of host machines, a priority level of telemetry data collected in the cluster, at least based on a data type of the telemetry data and a tag, wherein a quality-of-service (QOS) is associated with the priority level;
   store telemetry data of a first priority in storage allocated for telemetry data having the first priority;
   store telemetry data of a second priority in storage allocated for telemetry data having the second priority, wherein storage allocated for telemetry data having the first priority and storage all located for telemetry data having the second priority are separate from the cluster; and
   send the telemetry data from the storage to a server in accordance with the QoS, wherein the server is separate from the cluster.

2. The medium of claim 1, further comprising instructions that, when executed by the processor, cause the processor to:
   extract the telemetry data from a message including other telemetry data.

3. The medium of claim 1, further comprising telemetry data of a third priority that is stored in storage allocated for telemetry data having the third priority.

4. The medium of claim 1, further comprising instructions that, when executed by the processor, cause the processor to:
   receive the telemetry data from an application, wherein the application tags the telemetry data, wherein the tag indicates the level of priority.

5. The medium of claim 1, further comprising instructions that, when executed by the processor, cause the processor to:
   send an indication of the priority level to the server, wherein the server provides the telemetry data to a client portal in accordance with the priority level, based on the indication of the priority level.

6. The medium of claim 1, further comprising instructions that, when executed by the processor, cause the processor to:
   determine, in the cluster of host machines, the priority level of telemetry data collected in the cluster, at least based on an override policy.

7. The medium of claim 6, wherein the override policy includes a rule that, if a priority level based on the data type is different from a priority level based on the tag, the priority level based on the tag overrides the priority level based on the data type.

8. An apparatus comprising a processor and a memory, wherein the memory includes programmed instructions that, when executed by the processor, cause the apparatus to:
   determine, in a cluster of host machines, a priority level of telemetry data collected in the cluster, at least based on a data type of the telemetry data and a tag, wherein a quality-of-service (QOS) is associated with the priority level;
   store telemetry data of a first priority in storage allocated for telemetry data having the first priority;
   store telemetry data of a second priority in storage allocated for telemetry data having the second priority, wherein storage allocated for telemetry data having the first priority and storage all located for telemetry data having the second priority are separate from the cluster; and send the telemetry data from the storage to a server in accordance with the QoS, wherein the server is separate from the cluster.

9. The apparatus of claim 8, wherein the memory further includes programmed instructions that, when executed by the processor, cause the apparatus to:
   extract the telemetry data from a message including other telemetry data.

10. The apparatus of claim 8, wherein the memory further includes programmed instructions that, when executed by the processor, cause the apparatus to maintain separate transport queues to transport data, wherein each transport queue transports telemetry data of a different priority.

11. The apparatus of claim 10, wherein the memory further includes programmed instructions that, when executed by the processor, cause the apparatus to:
   allocate different bandwidths to the separate transport queues according to the priority level.

12. The apparatus of claim 8, wherein the memory further includes programmed instructions that, when executed by the processor, cause the apparatus to:
   send an indication of the priority level to the server, wherein the server provides the telemetry data to a client portal in accordance with the priority level, based on the indication of the priority level.

13. The apparatus of claim 8, wherein the memory further includes programmed instructions that, when executed by the processor, cause the apparatus to:
   determine, in the cluster of host machines, the priority level of telemetry data collected in the cluster, at least based on an override policy.

14. The apparatus of claim 13, wherein the override policy includes a rule that, if a priority level based on the data type is different from a priority level based on the tag, the priority level based on the tag overrides the priority level based on the data type.

15. A computer-implemented method comprising:
   determining, by a processor, in a cluster of host machines, a priority level of telemetry data collected in the cluster, at least based on a data type of the telemetry data and a tag, wherein a quality-of-service (QOS) is associated with the priority level;
   storing, by the processor, telemetry data of a first priority in storage allocated for telemetry data having the first priority;
   storing, by the processor, telemetry data of a second priority in storage allocated for telemetry data having the second priority, wherein storage allocated for telemetry data having the first priority and storage allocated for telemetry data having the second priority are separate from the cluster; and
   sending, by the processor, the telemetry data from the storage to a server in accordance with the QoS, wherein the server is separate from the cluster.

16. The method of claim 15, further comprising:
   extracting the telemetry data from a message including other telemetry data.

17. The method of claim 15, further comprising maintaining separate transport queues to transport data, wherein each transport queue transports telemetry data of a different priority.

18. The method of claim 15, further comprising:
   receiving the telemetry data from an application, wherein the application tags the telemetry data, wherein the tag indicates the level of priority.

19. The method of claim 15, further comprising:
   sending an indication of the priority level to the server, wherein the server provides the telemetry data to a client portal in accordance with the priority level, based on the indication of the priority level.

20. The method of claim 15, further comprising:
   determining, in the cluster of host machines, the priority level of telemetry data collected in the cluster, at least based on an override policy.

\* \* \* \* \*